United States Patent
Kakimoto et al.

(10) Patent No.: US 11,294,098 B2
(45) Date of Patent: Apr. 5, 2022

(54) SOLAR IRRADIANCE INTENSITY ESTIMATION APPARATUS, SOLAR IRRADIANCE INTENSITY ESTIMATION SYSTEM, AND SOLAR IRRADIANCE INTENSITY ESTIMATION METHOD

(71) Applicant: KABUSHIKI KAISHA TOSHIBA, Minato-ku (JP)

(72) Inventors: Mitsuru Kakimoto, Kawasaki (JP); Hiromasa Shin, Yokohama (JP); Yusuke Endoh, Kawasaki (JP); Yoshiaki Shiga, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 480 days.

(21) Appl. No.: 15/908,849

(22) Filed: Mar. 1, 2018

(65) Prior Publication Data
US 2019/0004211 A1 Jan. 3, 2019

(30) Foreign Application Priority Data
Jul. 3, 2017 (JP) .............................. JP2017-130554

(51) Int. Cl.
*G01W 1/12* (2006.01)
*G01J 1/20* (2006.01)
(Continued)

(52) U.S. Cl.
CPC ............. *G01W 1/12* (2013.01); *G01J 1/0228* (2013.01); *G01J 1/20* (2013.01); *G01J 1/42* (2013.01);
(Continued)

(58) Field of Classification Search
CPC ......... G01W 1/12; G01W 1/10; G01J 1/0228; G01J 1/20; G01J 1/42; G01J 2001/4276; G01J 2001/4285
See application file for complete search history.

(56) References Cited

U.S. PATENT DOCUMENTS

2014/0324352 A1* 10/2014 Hamann ................. G01W 1/10
702/3
2015/0177415 A1* 6/2015 Bing ....................... G01W 1/10
702/3
(Continued)

FOREIGN PATENT DOCUMENTS

| JP | H11-211560 | 8/1999 |
|----|------------|--------|
| JP | 3751737 | 3/2006 |

(Continued)

OTHER PUBLICATIONS

Mueller, R.; Trentmann, J.; Träger-Chatterjee, C.; Posselt, R.; Stöckli, R. The Role of the Effective Cloud Albedo for Climate Monitoring and Analysis. Remote Sens. 2011, 3, 2305-2320.*
(Continued)

*Primary Examiner* — Kamini S Shah
*Assistant Examiner* — Peter Pham
(74) *Attorney, Agent, or Firm* — Oblon, McClelland, Maier & Neustadt, L.L.P.

(57) ABSTRACT

A solar irradiance intensity estimation apparatus has an estimation model generation unit that generates estimation models of solar radiation intensities at a plurality of observation points based on observed cloud state data and solar radiation intensities observed at the plurality of observation points, an estimation model interpolation unit that generates an estimation model of a solar irradiance intensity at a target point based on the estimation models of solar radiation intensities at the plurality of observation points, and a solar irradiance intensity estimation unit that estimates a solar (Continued)

irradiance intensity at the target point based on a reflection intensity at the target point obtained from the cloud state data and the estimation model of a solar irradiance intensity at the target point.

15 Claims, 14 Drawing Sheets

(51) Int. Cl.
  G01W 1/10 (2006.01)
  G01J 1/42 (2006.01)
  G01J 1/02 (2006.01)

(52) U.S. Cl.
  CPC ....... G01W 1/10 (2013.01); *G01J 2001/4276* (2013.01); *G01J 2001/4285* (2013.01)

(56) References Cited

U.S. PATENT DOCUMENTS

| | | | | |
|---|---|---|---|---|
| 2016/0026740 | A1* | 1/2016 | Herzig | G01W 1/10 703/2 |
| 2017/0227583 | A1* | 8/2017 | Hoff | G01R 21/1331 |
| 2017/0286838 | A1* | 10/2017 | Cipriani | G06N 20/00 |
| 2017/0293049 | A1* | 10/2017 | Frank | G01W 1/12 |
| 2018/0136366 | A1* | 5/2018 | Vega-Avila | H02S 40/00 |
| 2019/0158011 | A1* | 5/2019 | West | G01J 1/4214 |

FOREIGN PATENT DOCUMENTS

| | | |
|---|---|---|
| JP | 2006-210750 | 8/2006 |
| JP | 2010-230587 | 10/2010 |
| JP | 2013-44572 | 3/2013 |
| JP | 5423096 | 2/2014 |
| JP | 2015-137903 | 7/2015 |
| JP | 2016-111822 A | 6/2016 |
| JP | 5989754 | 9/2016 |
| KR | 2016/0078920 A * | 7/2016 |

OTHER PUBLICATIONS

Takeshi Watanabe, Yu Oishi, Takashi Y. Nakajima, Characterization of surface solar-irradiance variability using cloud properties based on satellite observations, Solar Energy, vol. 140, 2016, pp. 83-92.*

Mueller, R.; Trentmann, J.; Träger-Chatterjee, C.; Posselt, R.; Stöckli, R. The Role of the Effective Cloud Albedo for Climate Monitoring and Analysis. Remote Sens. 2011, 3, 2305-2320. (Year: 2011).*

Takeshi Watanabe, Yu Oishi, Takashi Y. Nakajima, Characterization of surface solar-irradiance variability using cloud properties based on satellite observations, Solar Energy, vol. 140, 2016, pp. 83-92 (Year: 2016).*

Barker et al. ("Optical Depth of Overcast Cloud across Canada: Estimates Based on Surface Pyranometer and Satellite Measurements") (Year: 1998).*

Penner et al. ("A Comparison of Model- and Satellite-Derived Aerosol Optical Depth and Reflectivity") (Year: 2002).*

Mueller et al. ("Rethinking satellite-based solar irradiance modelling: The SOLIS clear-sky module") (Year: 2004).*

Xiaojin Zhu, John Lafferty, and Ronald Rosenfeld. Semi-supervised learning with graphs. Carnegie Mellon University, language technologies institute, school of computer science, 2005, 174 pages.

Low Temperature Science, vol. 72, pp. 145-150, 2014, 19 pages.

* cited by examiner

| TIME | POSITION 1 | POSITION 2 | ... | POSITION N |
|---|---|---|---|---|
| 2017/5/13 16:14 | $R_1$ | $R_2$ | ... | $R_N$ |
| 2017/5/14 9:27 | $M_1$ | $M_2$ | ... | $M_N$ |
| ... | ... | ... | ... | ... |
| 2017/5/21 11:53 | $P_1$ | $P_2$ | ... | $P_N$ |

14a

| POSITION NUMBER | LONGITUDE (deg) | LATITUDE (deg) |
|---|---|---|
| 1 | 138.3 | 37.1 |
| 2 | 138.3 | 37.2 |
| ... | ... | ... |
| N | 142.1 | 38.7 |

14b

| TIME | OBSERVATION POINT 1 | OBSERVATION POINT 2 | ... | OBSERVATION POINT G |
|---|---|---|---|---|
| 2017/5/13 16:14 | 851(W/m²) | 762(W/m²) | ... | 152(W/m²) |
| 2017/5/14 9:27 | 328(W/m²) | 483(W/m²) | ... | 117(W/m²) |
| ... | ... | ... | ... | ... |
| 2017/5/21 11:53 | 652(W/m²) | 798(W/m²) | ... | 428(W/m²) |

15a

| POSITION NUMBER | LONGITUDE (deg) | LATITUDE (deg) |
|---|---|---|
| A | 139.2 | 37.8 |
| B | 141.3 | 38.2 |
| ... | ... | ... |
| G | 140.2 | 37.5 |

15b

| TIME | POSITION 1 | POSITION 2 | ... | POSITION N |
|---|---|---|---|---|
| 2017/5/13 16:14 | VARIABLE 1 | VARIABLE 1 | ... | VARIABLE 1 |
| 2017/5/14 9:27 | VARIABLE 2 | VARIABLE 2 | ... | VARIABLE 2 |
| ... | ... | ... | ... | ... |
| 2017/5/21 11:53 | VARIABLE m | VARIABLE m | ... | VARIABLE m |

16a

| POSITION NUMBER | LONGITUDE (deg) | LATITUDE (deg) |
|---|---|---|
| 1 | 138.3 | 37.1 |
| 2 | 138.3 | 37.2 |
| ... | ... | ... |
| N | 142.1 | 38.7 |

| PARAMETER | OBSERVATION POINT A | OBSERVATION POINT B | ... | OBSERVATION POINT G |
|---|---|---|---|---|
| a | $a_A$ | $a_B$ | ... | $a_G$ |
| b | $b_A$ | $b_B$ | ... | $b_G$ |

↖ 17a

| POSITION NUMBER | LONGITUDE (deg) | LATITUDE (deg) |
|---|---|---|
| A | 139.2 | 37.8 |
| B | 141.3 | 38.2 |
| ... | ... | ... |
| G | 140.2 | 37.5 |

↖ 17b

| PARAMETER | OBSERVATION POINT A | OBSERVATION POINT B | ... | OBSERVATION POINT G |
|---|---|---|---|---|
| a | $a_A$ | $a_B$ | ... | $a_G$ |
| b | $b_A$ | $b_B$ | ... | $b_G$ |
| c | $c_A$ | $c_B$ | ... | $c_G$ |

24a

| POSITION NUMBER | LONGITUDE (deg) | LATITUDE (deg) |
|---|---|---|
| A | 139.2 | 37.8 |
| B | 141.3 | 38.2 |
| ... | ... | ... |
| G | 140.2 | 37.5 |

24b

SOLAR IRRADIANCE INTENSITY ESTIMATION APPARATUS, SOLAR IRRADIANCE INTENSITY ESTIMATION SYSTEM, AND SOLAR IRRADIANCE INTENSITY ESTIMATION METHOD

CROSS REFERENCE TO RELATED APPLICATIONS

This application is based upon and claims the benefit of priority from the prior Japanese Patent Application No. 2017-130554, filed on Jul. 3, 2017, the entire contents of which are incorporated herein by reference.

FIELD

Embodiments of the present invention relate to a solar irradiance intensity estimation apparatus, a solar irradiance intensity estimation system, and a solar irradiance intensity estimation method.

BACKGROUND

It is necessary to accurately grasp a solar irradiance intensity on the ground surface in order to make effective use of solar power generation. However, pyranometers are merely arranged sparsely at specific points (hereinafter referred to as observation points) on the ground surface, and thus, it is necessary to spatially interpolate solar radiation intensities at a plurality of observation points in order to estimate a solar irradiance intensity at an arbitrary target point. As a result, it is possible to estimate the solar irradiance intensity at the arbitrary target point positioned among the observation points based on the solar radiation intensities obtained at the plurality of sparsely-arranged observation points.

As a method of estimating the solar irradiance intensity, a method of weighting the solar radiation intensities of the respective observation points and combining the weighted solar radiation intensities according to a distance between the target point and the plurality of observation points, or the like is frequently used. In this method, a change in solar irradiance intensity between the target point and the observation point needs to be smooth to some extent. In practice, however, the solar irradiance intensity often changes rapidly depending on presence or absence of clouds, and the smooth change in solar irradiance intensity is not guaranteed. Thus, recently, solar irradiance intensity estimation using cloud state data observed in a wide area, for example, a meteorological satellite image and the like is performed.

The meteorological satellite image is not obtained by directly observing the solar irradiance intensity on the ground, and thus, it is necessary to estimate the solar irradiance intensity to be matched to the solar irradiance intensity observed by the pyranometer. However, weather conditions are different for each point on the ground, and thus, it is not easy to improve the accuracy in estimation of the solar irradiance intensity.

BRIEF DESCRIPTION OF THE DRAWINGS

FIG. 7 is a view illustrating a data configuration of an environment DB;

DETAILED DESCRIPTION

According to one embodiment, a solar irradiance intensity estimation apparatus has an estimation model generation unit that generates estimation models of solar radiation intensities at a plurality of observation points based on observed cloud state data and solar radiation intensities observed at the plurality of observation points, an estimation model interpolation unit that generates an estimation model of a solar irradiance intensity at a target point based on the estimation models of solar radiation intensities at the plurality of observation points, and a solar irradiance intensity estimation unit that estimates a solar irradiance intensity at the target point based on a reflection intensity at the target point obtained from the cloud state data and the estimation model of a solar irradiance intensity at the target point.

Hereinafter, embodiments will be described with reference to the drawings. In the present specification and accompanying drawings, the description and illustration are given by omitting, changing, or simplifying some components for ease of understanding and convenience in illustration, but technical contents at the extent with which similar functions can be expected are also interpreted as being included in the embodiments.

First Embodiment

Figure 1:
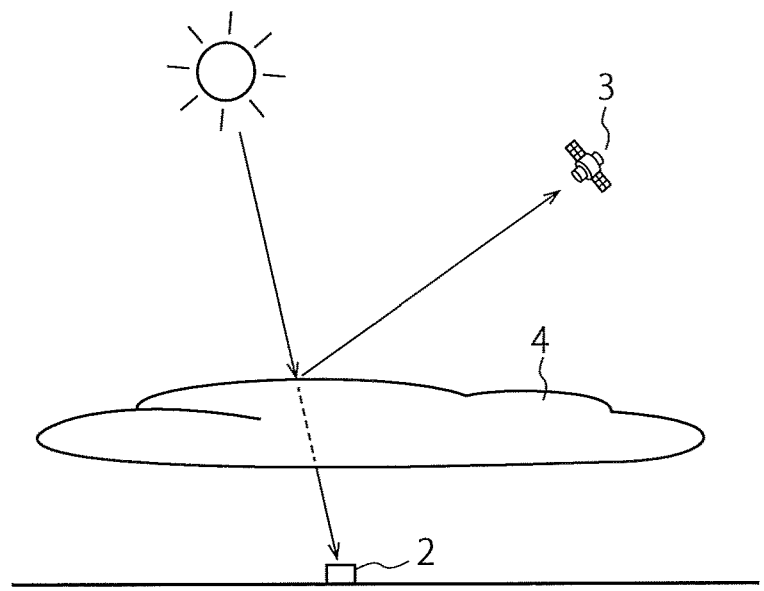
FIG. 1 is a view for describing a principle of a solar irradiance intensity estimation apparatus according to a first embodiment.

FIG. 1 is a view for describing a principle of a solar irradiance intensity estimation apparatus 1 according to a first embodiment. The solar irradiance intensity estimation apparatus 1 according to the present embodiment estimates a solar irradiance intensity at an arbitrary target point on the ground. Pyranometers 2 are scattered on the ground, and the pyranometer 2 is configured to observe a solar irradiance intensity at an installation place, and it is difficult to accurately know a solar irradiance intensity at a place where the pyranometer 2 is not installed. A meteorological satellite 3 exists above the earth, and a satellite image captured by the meteorological satellite 3 includes luminance information corresponding to a reflection intensity of sunlight reflected by a cloud 4. The solar irradiance intensity estimation apparatus 1 according to the present embodiment accumulates multiple correspondence relationships between reflection intensities of satellite images and solar radiation intensities observed by the pyranometers 2 and perform learning of the correspondence relationship, thereby accurately estimating the solar irradiance intensity at the arbitrary target point on the ground based on the reflection intensity of the satellite image.

Figure 2:
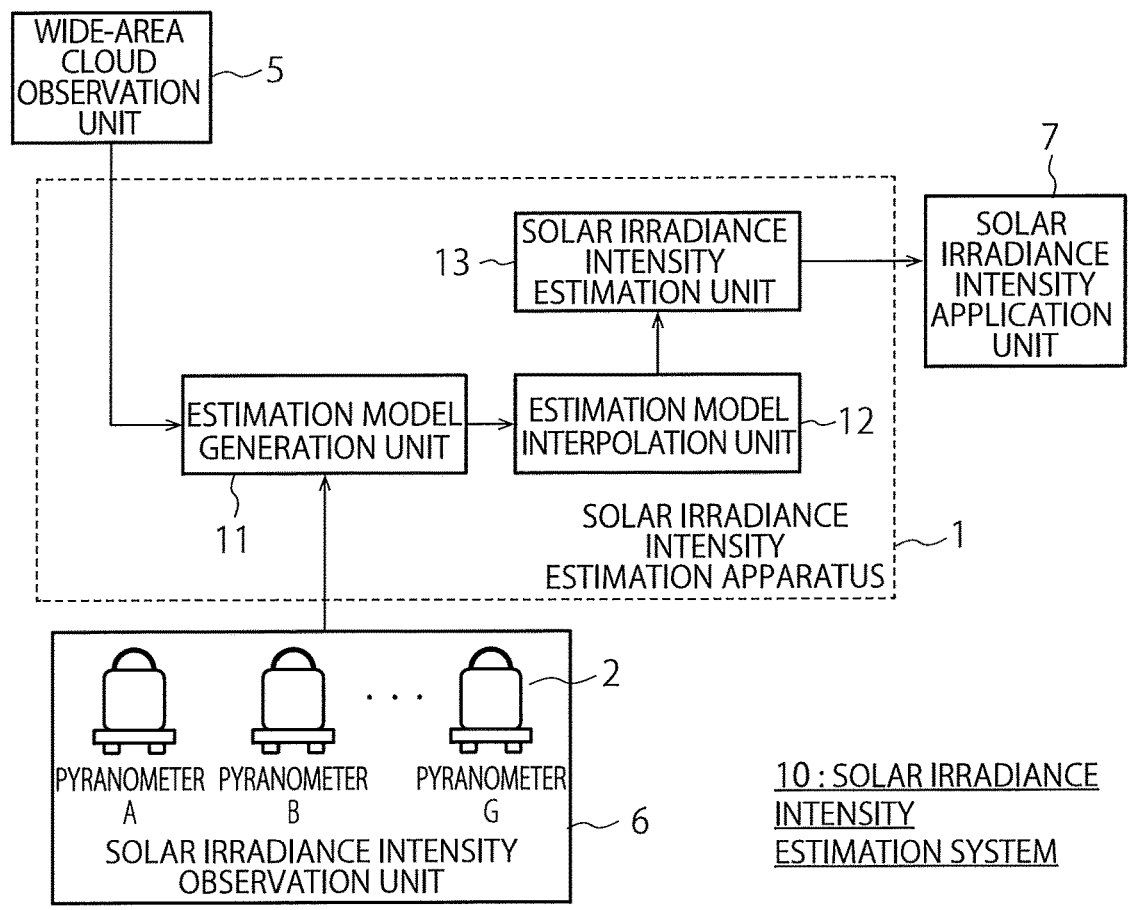
FIG. 2 is a block diagram illustrating a schematic configuration of a solar irradiance intensity estimation system according to the first embodiment.

FIG. 2 is a block diagram illustrating a schematic configuration of a solar irradiance intensity estimation system 10 including the solar irradiance intensity estimation apparatus 1 according to the first embodiment. The solar irradiance intensity estimation system 10 of FIG. 2 includes the solar irradiance intensity estimation apparatus 1, a wide-area cloud observation unit 5, and a solar irradiance intensity observation unit 6.

The solar irradiance intensity estimation apparatus 1 estimates a solar irradiance intensity at an arbitrary target point X on the ground as will be described later. More specifically, the solar irradiance intensity estimation apparatus 1 estimates the solar irradiance intensity at the target point X based on an actually-measured solar irradiance intensity observed by the solar irradiance intensity observation unit 6 and the reflection intensity of the sunlight reflected by the cloud.

The wide-area cloud observation unit 5 includes a sensor that observes a state of clouds over a wide area including the target point X to estimate the solar irradiance intensity and a plurality of observation points to observe the actually-measured solar radiation intensities. The wide-area cloud observation unit 5 is typically the meteorological satellite 3. The meteorological satellite 3 captures an image of the earth from above the earth. When the meteorological satellite 3 is a geostationary satellite, the meteorological satellite 3 is always positioned on the same longitude on the equator. The meteorological satellite 3 is far from the earth by a sufficient distance, and thus, is capable of capturing substantially a hemisphere of the earth, and can successively collect weather data over an extremely wide area. Here, the image is not limited to an image of visible light, and may include an infrared image in some cases.

The wide-area cloud observation unit 5 can also employ a satellite passing through a lower orbit. In this case, this satellite revolves closely around the earth, and thus, can collect higher resolution data. Since this type of satellite is not fixed when viewed from the ground, it is difficult to collect successive data of the same area only by the single satellite. Thus, a plurality of satellites flies over a target region by adjusting a time interval so that it is possible to perform successive observation.

The wide-area cloud observation unit 5 may include a weather radar. The weather radar can collect wide-area weather conditions, and thus, can observe wide-area cloud data. In the case of using the weather radar, it is possible to observe the cloud state by using a weather radar that can use radio waves of a frequency band with which the cloud state can be detected. In addition, the wide-area cloud observation unit 5 may be an image capturing device mounted on an aircraft, a ground observation camera, or the like.

The solar irradiance intensity observation unit 6 observes the solar irradiance intensity on the ground at the plurality of observation points discretely arranged inside the target region. The solar irradiance intensity observation unit 6 has, for example, the plurality of pyranometers 2 arranged at the plurality of observation points. Incidentally, the solar irradiance intensity observation unit 6 may indirectly observe the solar irradiance intensity, and the solar irradiance intensity observation unit 6 is not necessarily limited to the pyranometer 2. In addition, a solar power generation apparatus can indirectly estimate the solar irradiance intensity, and thus, can be used as the solar irradiance intensity observation unit 6.

The solar irradiance intensity estimation system 10 of FIG. 2 may include a solar irradiance intensity application unit 7 as an optional configuration. The solar irradiance intensity application unit 7 performs various types of processing using the solar irradiance intensity estimated by the solar irradiance intensity estimation apparatus 1.

The solar irradiance intensity application unit 7 may have a diagnostic function of, for example, the solar power generation apparatus. The output of the solar power generation apparatus largely depends on the weather condition. In the case of large-scale apparatuses such as a mega solar system, a solar irradiance intensity measurement apparatus for reference is often installed in the premises thereof. However, the solar irradiance intensity measurement apparatus is not installed in small-scale equipment or roofs of ordinary households, and it is difficult to determine whether the equipment outputs a proper output. Thus, even if deterioration or failure of the equipment occurs, such occurrence is likely to be overlooked. If the solar irradiance intensity at the arbitrary target point X can be estimated by the solar irradiance intensity estimation apparatus 1 according to the present embodiment, diagnosis on whether the equipment is correctly generating power is possible based on such estimation.

In addition, the solar irradiance intensity application unit 7 may have an image recognition processing function in the open air. There are increased number of systems that require determination based on image recognition in the open air such as automatic driving of cars and a surveillance camera outside the city. It is considered that how an object looks in the open air greatly depends on a situation of solar radiation at the place of that time. If the solar irradiance intensity is known according to the present embodiment, the accuracy of image recognition is improved, and it is possible to avoid an accident in automatic driving and to expect a crime prevention effect by improving person recognition accuracy. In addition, the solar irradiance intensity application unit 7 can be also used directly for improvement of image quality by adjusting the sensitivity of a camera based on an estimation value of the solar irradiance intensity.

In addition, the solar irradiance intensity application unit 7 may have an air-conditioning control function. In general, control of room temperature inside a building is performed based on temperature at that time. It is considered that such an effect appears in a temporally delayed manner considering a situation where the building is warmed by solar radiation. Therefore, the control is likely to be late in the case of control based only on the room temperature. As the solar irradiance intensity value is used, it is possible to perform predictive control, and improvement of air-conditioning efficiency can be expected. It is possible to expect a particularly great effect in an agricultural house or the like where the influence of solar radiation is remarkable.

Next, the solar irradiance intensity estimation apparatus 1 according to the present embodiment will be described in detail. As illustrated in FIG. 2, the solar irradiance intensity estimation apparatus 1 according to the present embodiment includes an estimation model generation unit 11, an estimation model interpolation unit 12, and a solar irradiance intensity estimation unit 13.

The estimation model generation unit 11 generates estimation models of solar radiation intensities at a plurality of observation points based on cloud state data observed over a wide area and actually-measured solar radiation intensities at the plurality of observation points. For example, a satellite image is used as the cloud state data. The actually-measured solar irradiance intensity at the observation point is, for example, the solar irradiance intensity observed by the pyranometer 2. The estimation model can be represented using the actually-measured solar irradiance intensity and a plurality of model variables (hereinafter referred to as model parameters). A specific formula representing the estimation model will be described later.

The estimation model interpolation unit 12 generates an estimation model of a solar irradiance intensity at the target point X based on the plurality of estimation models at the plurality of observation points generated by the estimation model generation unit 11. The target point X is an arbitrary point among the plurality of observation points where the pyranometers 2 exist. The estimation model interpolation unit 12 can generate an estimation model of a solar irradiance intensity at an arbitrary point where the pyranometer 2 does not exist.

The solar irradiance intensity estimation unit 13 estimates the solar irradiance intensity at the target point X based on the reflection intensity at the target point X obtained from the cloud state data and an estimation model at the target point X generated by the estimation model interpolation unit 12. For example, when the satellite image is used as the cloud state data, the reflection intensity at the target point X can be acquired from the satellite image. The solar irradiance intensity estimation unit 13 estimates the solar irradiance intensity at the target point X by inputting the reflection intensity at the target point X to the estimation model at the target point X generated by the estimation model interpolation unit 12.

Figure 3:
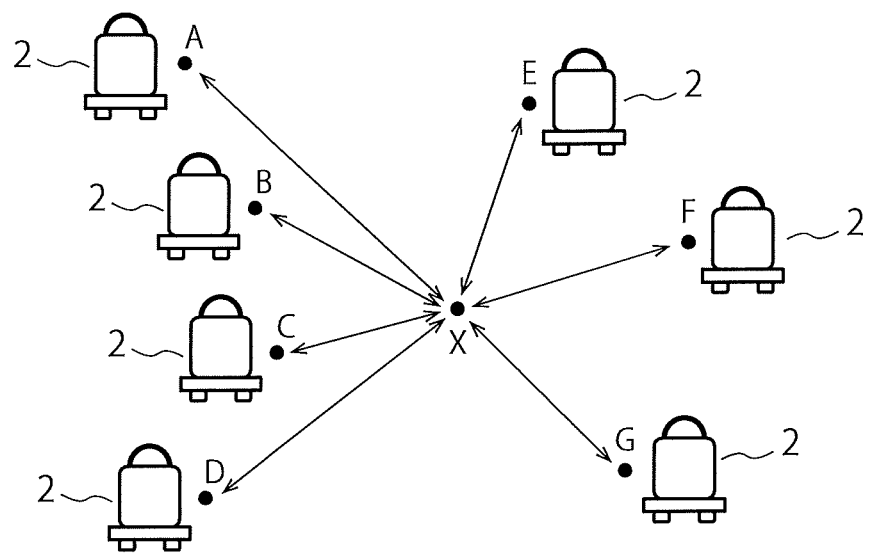
FIG. 3 is a view for describing observation points of a solar irradiance intensity and a target point.

FIG. 3 is a view for describing a plurality of observation points A, B, . . . , and G of solar radiation intensities inside a target region and the target point X to estimate the solar irradiance intensity. The pyranometers 2 are arranged at the observation points, respectively, and each of the pyranometers 2 observes the solar irradiance intensity of the corresponding observation point as will be described later. Since the pyranometer 2 is not arranged at the target point X, the solar irradiance intensity estimation unit 13 estimates the solar irradiance intensity at the target point X based on the actually-measured solar radiation intensities observed by the pyranometers 2 at the plurality of observation points around the target point X.

Figure 4:
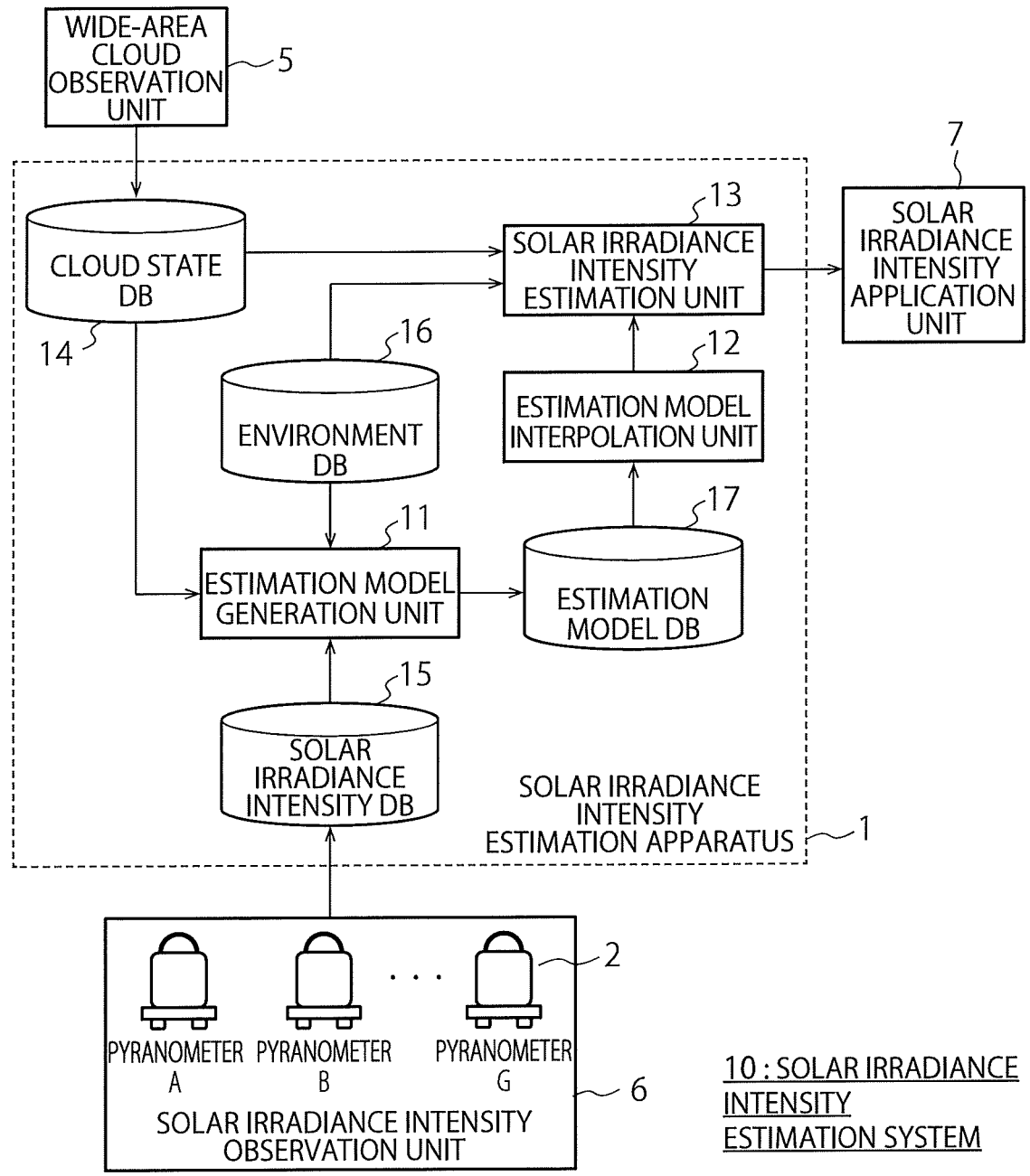
FIG. 4 is a block diagram illustrating a schematic configuration of the solar irradiance intensity estimation apparatus obtained by embodying FIG. 2 in more detail.

FIG. 4 is a block diagram illustrating a schematic configuration of the solar irradiance intensity estimation apparatus 1 obtained by embodying FIG. 2 in more detail.

The solar irradiance intensity estimation apparatus 1 of FIG. 4 includes a cloud state database (hereinafter referred to as the cloud state DB) 14, a solar irradiance intensity database (hereinafter referred to as the solar irradiance intensity DB) 15, an environmental database (hereinafter referred to as the environment DB) 16, and an estimation model DB 17 in addition to the estimation model generation unit 11, the estimation model interpolation unit 12, and the solar irradiance intensity estimation unit 13.

The cloud state DB 14 stores the cloud state data observed by the wide-area cloud observation unit 5. The cloud state DB 14 is typically a meteorological satellite image database or the like. In this case, the reflection intensity of the sunlight observed by the satellite is converted into image data. The data is taken in a sufficiently dense manner in time to such an extent that it is regarded as being acquired successively in time. In addition, if a spatial position is designated, observation data at that position can be acquired. For example, in the case of a satellite image, a position on the earth is associated with a pixel on the image, and thus, it is possible to acquire a reflection intensity at an arbitrary point within an image range.

Figure 5:
FIG. 5 is a view illustrating a data configuration of a cloud state DB.
Figure 5:

FIG. 5 is a view illustrating a data configuration of the cloud state DB 14. The cloud state DB 14 of FIG. 5 has a cloud state value table 14a and a position table 14b. The cloud state value table 14a stores a cloud state at each of positions 1 to N for each time. The position table 14b stores a correspondence relationship between position numbers of the respective positions 1 to N and position information including a longitude (deg) and a latitude (deg) of each of the positions 1 to N. The plurality of observation points and the target point X are included among the positions 1 to N.

The solar irradiance intensity DB 15 stores observation values of ground solar radiation intensities observed by the solar irradiance intensity observation unit 6. More specifically, the solar irradiance intensity DB 15 stores the solar radiation intensities observed for a certain period or longer by the solar irradiance intensity observation unit 6 arranged at the observation point. The observation data of the solar irradiance intensity is taken in a sufficiently dense manner in time to such an extent that it is regarded as being successive in time. If an observation point and time are designated, it is possible to acquire the solar irradiance intensity at the designated place and time.

Figure 6:
FIG. 6 is a view illustrating a data configuration of a solar irradiance intensity DB.
Figure 6:

FIG. 6 is a view illustrating a data configuration of the solar irradiance intensity DB 15. The solar irradiance intensity DB 15 of FIG. 6 has a solar irradiance intensity table 15a and an observation point position table 15b. The solar irradiance intensity table 15a stores a correspondence relationship between the time and the actually-measured solar irradiance intensity (W/m$^2$) of each of observation points A to G. The observation point position table 15b stores a longitude (deg) and a latitude (deg) of each observation point.

The environment DB 16 stores auxiliary environmental information which is necessary for calculation of a solar irradiance intensity. Specifically, the environmental information includes at least one of information on an atmospheric condition and sensor information. The information on the atmospheric condition includes, for example, the amount of water vapor in the atmosphere, the quantities of fine particles in the atmosphere, a ground surface reflection coefficient, a sunlight intensity outside the atmosphere, and the like. The sensor information includes position information of a satellite (a longitude on a geosynchronous orbit) and position information of the observation point, for example, in the case of the meteorological satellite 3.

FIG. 7 is a view illustrating a data configuration of the environment DB 16. The environment DB 16 in FIG. 7 has an environment variable value table 16a and a position table 16b. The environment variable value table 16a stores variables representing types of the environmental information at each position at each time. The position table 16b stores a correspondence relationship between a position number to identify each position, the longitude (deg), and the latitude (deg).

Specific environmental information necessary for calculation of a solar irradiance intensity varies depending on formulas of estimation models, and there may be a case where environmental information other than the above-described information is required.

The estimation model DB 17 stores solar irradiance intensity estimation models $I_A$, $I_B$, ..., and $I_G$ at observation points within the target region generated by the estimation model generation unit 11.

The estimation model generation unit 11 estimates a solar irradiance intensity at each observation point based on the cloud information data stored in the cloud state DB 14 and the ground solar irradiance intensity stored in the solar irradiance intensity DB 15. When a value of the cloud state data at the observation point A at time t is $r_t$ and a value of solar irradiance intensity data is $I_t$, an estimation model at the observation point A is the function $I_A$ that outputs an estimated value of $I_t$ with $r_t$ as an input.

Figures 8, 9:
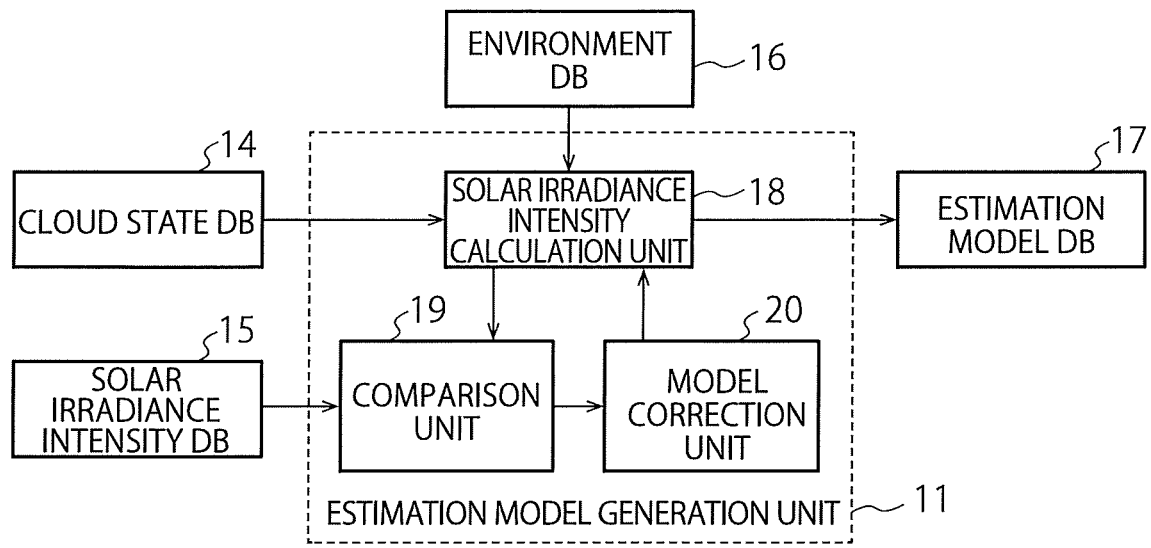
FIG. 8 is a block diagram illustrating an example of an internal configuration of an estimation model generation unit.
FIG. 9 is a view illustrating a data configuration of an estimation model DB.

FIG. 8 is a block diagram illustrating an example of an internal configuration of the estimation model generation unit 11. The estimation model generation unit 11 in FIG. 8 includes a solar irradiance intensity calculation unit 18, a comparison unit 19, and a model correction unit 20.

The solar irradiance intensity calculation unit 18 calculates a solar irradiance intensity at an observation point based on the cloud state data stored in the cloud state DB 14, the environment information stored in the environment information DB, and an initial estimation model.

The comparison unit 19 compares the solar irradiance intensity calculated by the solar irradiance intensity calculation unit 18 with the actually-measured solar irradiance intensity at the observation point. The model correction unit 20 generates an estimation model obtained by correcting the initial estimation model such that the solar irradiance intensity calculated by the solar irradiance intensity calculation unit 18 matches the actually-measured solar irradiance intensity at the observation point.

Hereinafter, an operation of the estimation model generation unit 11 will be described in more detail using an example of a simple regression model. For example, the estimation model can be formulated as a regression analysis problem with respect to a model of estimating the solar irradiance intensity $I_t$ from the cloud state data $r_t$ according to, the following Formula (1).

$$I_A(r_t) = ar_t + b \tag{1}$$

In the above Formula (1), a and b are undetermined coefficients which are model parameters. These values are determined by a least-square method as expressed in the following Formula (2).

$$a, b = \arg\min_{a,b} \sum_t (I_t - I_A(r_t))^2 \tag{2}$$

Here, t changes depending on a period (for example, one year) set in the past. The model correction unit 20 corrects the model parameters a and b by calculation of Formula (2).

To perform correction of the estimation model by Formula (2) is a general method of regression analysis. When there are the observation points A, B, ..., and G in the target region, the estimation models $I_A$, $I_B$, ..., and $I_G$ are generated for the respective observation points. Hereinafter, model parameters of the estimation models corresponding to the observation points A, B, ..., and G are expressed as ($a_A$, $b_A$), ($a_B$, $b_B$), ..., and ($a_G$, $b_G$), respectively.

Since the values of the model parameters a and b are mutually different in the respective estimation models stored in the estimation model DB 17, the estimation model DB 17 has a parameter value table 17a and an observation position table 17b. In the parameter value table 17a, the values of the model parameters a and b are stored for each observation point as illustrated in FIG. 9. The model parameters a and b stored in the estimation model DB 17 can be read out by designating an observation point as necessary. In the observation position table 17b, position information including the longitude (deg) and the latitude (deg) of each observation point is stored.

The estimation model interpolation unit 12 generates an estimation model $I_X$ at the arbitrary target point X in the target region using estimation models of the observation points A, B, ..., and G around the observation point X. Incidentally, the estimation model $I_X$ at the target point X may be generated by using estimation models of all the observation points in the target region as the observation points around the target point X. When there is a limit on calculation throughput, for example, some of the observation points may be selected by using a threshold according to the distance from the target point X, for example.

As a result, it may be considered that the selected observation points are A, B, ..., and G.

Hereinafter, a description will be given regarding interpolation processing performed by the estimation model interpolation unit 12 using a weighting function according to each distance between the target point X and the plurality of observation points. Here, a weighting function W(L) of a distance between two points is assumed. Typically, the weighting function W(L) is expressed by the following Formula (3).

$$W(L) = \frac{1}{L^2} \tag{3}$$

Incidentally, the weighting function W(L) is not necessarily limited to the above Formula (3). In general, however, W(L) is a monotonically decreasing function of a distance L because a smaller weight is set as a distance is farther. This Formula (3) is used to form the estimation model $I_X$ at the target point X as expressed in the following Formula (4)

$$I_x(r) = \frac{1}{\sum_{i=A,B,\ldots,G} W(L_i)} \sum_{i=A,B,\ldots,G} W(L_i) I_i(r) \quad (4)$$

$L_i$ (i=A, B, . . . , and G) is a distance between an observation point i and the target point X.

Figure 10:
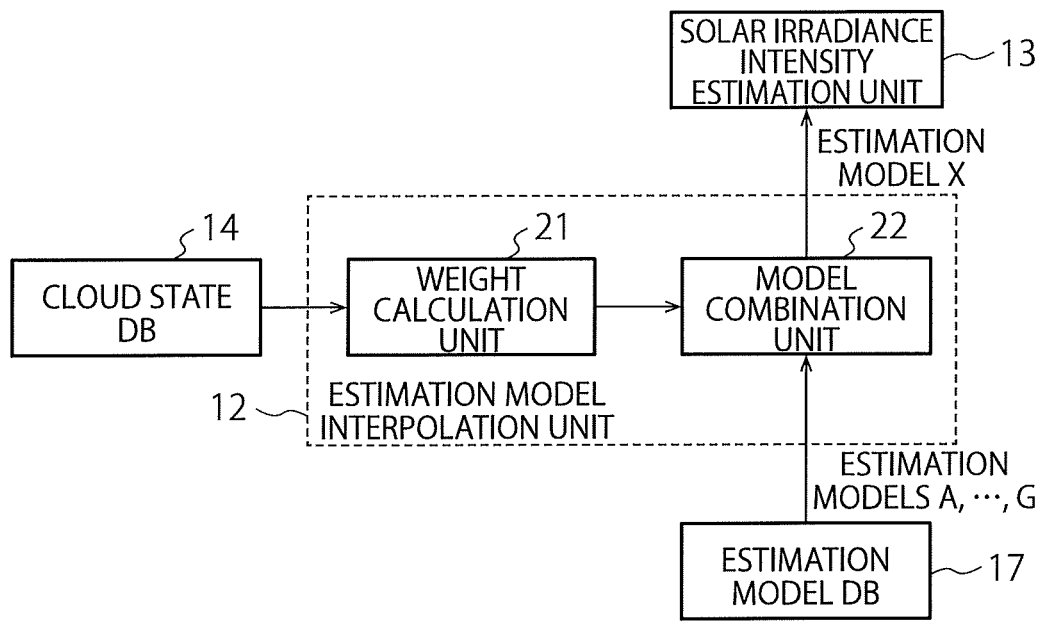
FIG. 10 is a block diagram illustrating an example of an internal configuration of an estimation model interpolation unit.

FIG. 10 is a block diagram illustrating an example of an internal configuration of the estimation model interpolation unit 12. The estimation model interpolation unit 12 in FIG. 10 includes a weight calculation unit 21 and a model combination unit 22.

The weight calculation unit 21 calculates each weight W(L) of a plurality of observation points with respect to the target point X according to, for example, the above Formula (3). The model combination unit 22 performs weighting of the estimation models of the plurality of observation points with the corresponding weights according to, for example, the above Formula (4), and combines the weighted estimation models to generate a combined estimation model $I_X(r)$.

The solar irradiance intensity estimation unit 13 in FIG. 4 estimates the solar irradiance intensity at the target point X by using the estimation model IX at the target point X generated by the estimation model interpolation unit 12. The time to be estimated is t. Here, t may be any time in the past, or may be a time set in a substantially real-time manner when the cloud state data has already been acquired.

The solar irradiance intensity estimation unit 13 acquires the cloud state $r_t$ of the target point X from the cloud state DB 14 and acquires the environmental information of the target point X from the environment DB 16. The solar irradiance intensity calculation unit 18 similar to the estimation model generation unit 11 is built in the solar irradiance intensity estimation unit 13, and calculates an estimation model $I_X(r_t)$ using the estimation model $I_X$, the cloud state $r_t$, and the environment information to obtain an estimation value of the solar irradiance intensity at the target point X.

Figure 11:
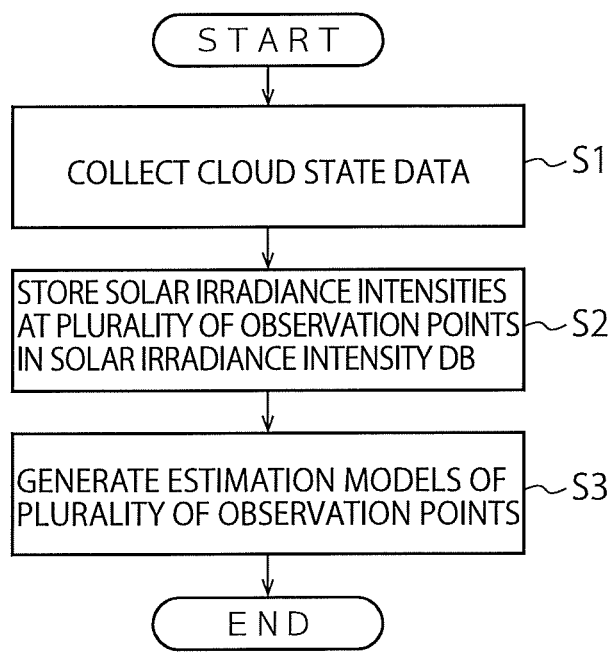
FIG. 11 is a flowchart of a preparation procedure.
Figure 12:
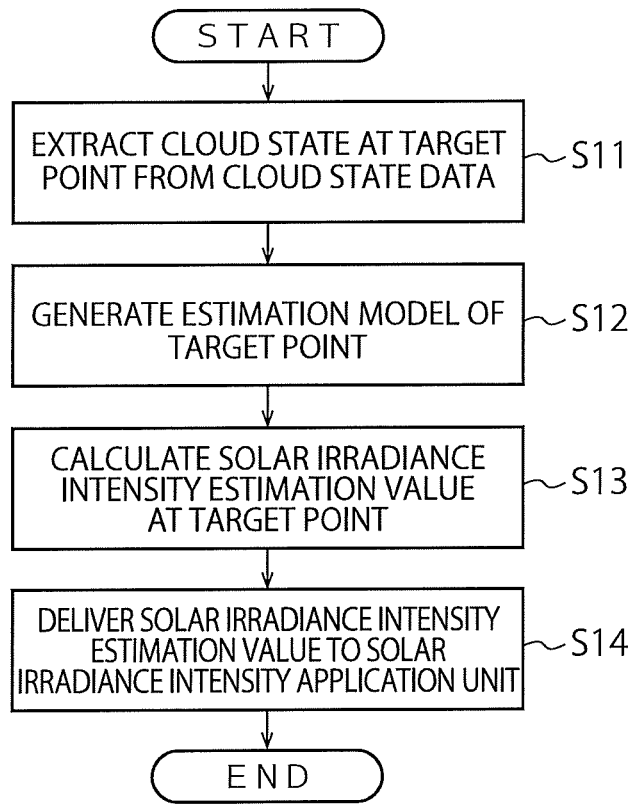
FIG. 12 is a flowchart of an estimation procedure.

Next, a procedure of the process of estimating the solar irradiance intensity at the arbitrary target point X will be described. The procedure of the process of estimating the solar irradiance intensity is divided into two procedures, that is, a preparation procedure and an estimation procedure. FIG. 11 is a flowchart of the preparation procedure, and FIG. 12 is a flowchart of the estimation procedure.

In the preparation procedure of FIG. 11, cloud state data is first collected (S1). More specifically, the cloud state data observed by the wide-area cloud observation unit 5 is stored in the cloud state DB 14. Hereinafter, an example in which the wide observation unit is the meteorological satellite 3 will be described. In the case of the satellite image, an image of the target region is taken at an interval of once every several minutes. It is assumed that the captured image of the target region is transmitted to a base station on the ground in a substantially real-time manner. The cloud state DB 14 is connected to a reception device at the base station via a communication network and stores the transmitted image. In the case of the meteorological satellite 3, basically, the collection of satellite images is always performed. The target region to be captured is also basically set, and a correspondence relationship between a pixel of an image and a point on the ground is fixed.

The solar irradiance intensity observation unit 6 observes the solar irradiance intensity using the plurality of pyranometers 2 arranged at the plurality of observation points in the target region. The plurality of observed solar radiation intensities are stored (collected) in the solar irradiance intensity DB 15 (S2). In general, it is possible to observe the amount of solar radiation at an interval of about one minute if using the plurality of pyranometers 2. The observed solar irradiance intensity data is stored (collected) in the solar irradiance intensity DB 15 via a communication network or the like in a real-time manner. However, when it is difficult to collect the solar irradiance intensity data in a real-time manner, a mechanism in which solar irradiance intensity data is stored in a temporary storage device and is periodically collected, may be provided.

The estimation model generation unit 11 generates the estimation models $I_A$, $I_B$, . . . , and $I_G$ for the plurality of observation points A, B, . . . , and G, respectively, using the cloud state stored in the cloud state DB 14 and the solar irradiance intensity data stored in the solar irradiance intensity DB 15 (S3). At this time, an update frequency of the estimation model and a duration of the cloud state data and the solar irradiance intensity data used for the generation of the estimation model become problematic.

The weather condition changes even in a longer time scale, which is different from a time scale in which the cloud state data varies. There are seasonal variations typically, and there are also climate variations in a longer time scale. Therefore, there is no end even if once an estimation model is generated, but needs to be updated. In general, predictive performance is favorable if the model is updated using new data, but an increase in model update frequency leads to an increase in calculation cost. One solution is to constantly keep track of the predictive performance of the model and to update the model if the predictive performance deteriorates. The estimated model is stored in the estimation model DB 17.

When the process of S3 in FIG. 11 is ended, the processing of the estimation procedure of FIG. 12 is started. In the estimation procedure of FIG. 12, the cloud state $r_t$ of the target point X is first extracted from the cloud state data (S11). The cloud state $r_t$ is, for example, a reflection intensity of sunlight at the target point X.

The estimation model interpolation unit 12 generates the estimation model $I_X$ of the target point X using the estimation models $I_A$, $I_B$, . . . , and $I_G$ of the plurality of observation points A, B, . . . , and G around the target point X (S12).

The solar irradiance intensity estimation unit 13 calculates the solar irradiance intensity estimation value $I_X(r_t)$ of the target point X based on the cloud state $r_t$ of the target point X and the estimation model $I_X$ of the target point X (S13).

The calculated solar irradiance intensity estimation value $I_X(r_t)$ of the target point X is delivered to the solar irradiance intensity application unit 7 which is an application program (S14).

Here, the application program refers to useful processing and control to be performed using the estimation value of the solar irradiance intensity on the ground at the target point X obtained according to the present embodiment. Typically, management and operation of solar power generation equipment may be exemplified. The solar power generation equipment may generate the amount of power that is not suitable for an actual solar irradiance intensity of sunlight due to deterioration or failure in some cases. Thus, it is possible to detect the failure or deterioration at an early stage by comparing the estimated solar irradiance intensity with the power generation amount, thereby alleviating an economic loss.

In addition, the estimation of the solar irradiance intensity is advantageous to take countermeasures against heat and countermeasures against sunburn, and the application program is not necessarily limited to a solar power generation-related program.

In this manner, the cloud state at the target point X is extracted based on the cloud state data such as the satellite image, the estimation model of the target point X is generated based on the extracted cloud state, and the solar irradiance intensity at the target point X is estimated based on the generated estimation model of the target point X in the first embodiment. As a result, it is possible to easily and accurately estimate the solar irradiance intensity even at the arbitrary target point X inside the target region at which the pyranometer 2 does not exist.

Second Embodiment

In a second embodiment, interpolation processing of an estimation model is performed in consideration of a similarity in a weather condition.

The description has been given regarding the example in which the estimation model interpolation unit 12 according to the above-described first embodiment performs the interpolation processing by weighting according to the distance between the observation point and the target point X. Meanwhile, whether a spatial distance is short or far does not necessarily mean whether the similarity in the weather condition is high or low.

Figure 13:
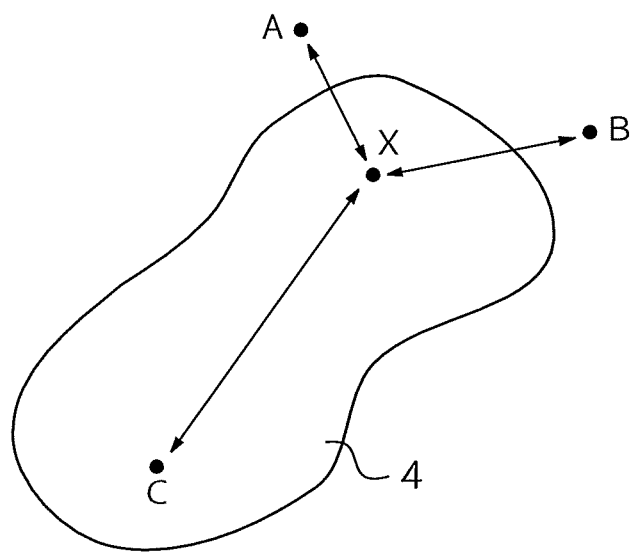
FIG. 13 is a view for describing a similarity in a weather condition.

FIG. 13 is a view for describing the similarity in the weather condition. FIG. 13 illustrates an example in which three observation points A, B, and C exist around a target point X. The observation point A is the closest to the target point X in terms of a distance, and the observation points B and C are farther in order. It is assumed that a cloud 4 is placed above a target region. A lump of this cloud 4 covers the sky above the target point X and the observation point C, but there is no cloud above the observation points A and B. In this situation, the observation point C is the closest to the target point X in terms of the weather condition and has the maximum similarity.

Therefore, when interpolating an estimation model, it is desirable to perform weighting based on the similarity in weather condition instead of weighting the estimation models at the respective observation points simply according to the distance from the target point X. A wide-area cloud observation unit 5 observes cloud state data over a wide area, and thus, it is possible to accurately detect the similarity in terms of the weather condition between the target point X and the observation point.

The above-described similarity in terms of the weather condition is useful when the estimation model depends on a variable other than the cloud state. A typical example of the variable is a cloud shape. Clouds are classified into several cloud shapes such as cirrus and altostratus, and it is known that characteristics of a ground solar irradiance intensity change depending on the cloud shape. Therefore, it is possible to expect improvement in estimation performance of the solar irradiance intensity if the cloud shape is incorporated as an explanatory variable of the estimation model.

Although the cloud shape can be distinguished from the observation point on the ground, the cloud state data over the wide area such as a satellite image has insufficient resolution so that it is difficult to distinguish the cloud shape. However, if the observation point C and the target point X are covered under the same lump of the cloud as in the above-described example, it is possible to estimate that these two points are located under the cloud having the same cloud shape. Using this fact, it is possible to increase the solar irradiance intensity estimation performance.

A variable that is advantageous for the solar irradiance intensity estimation but not observable by the wide-area cloud observation unit 5, such as the cloud shape, is referred to as an auxiliary variable.

Figure 14:
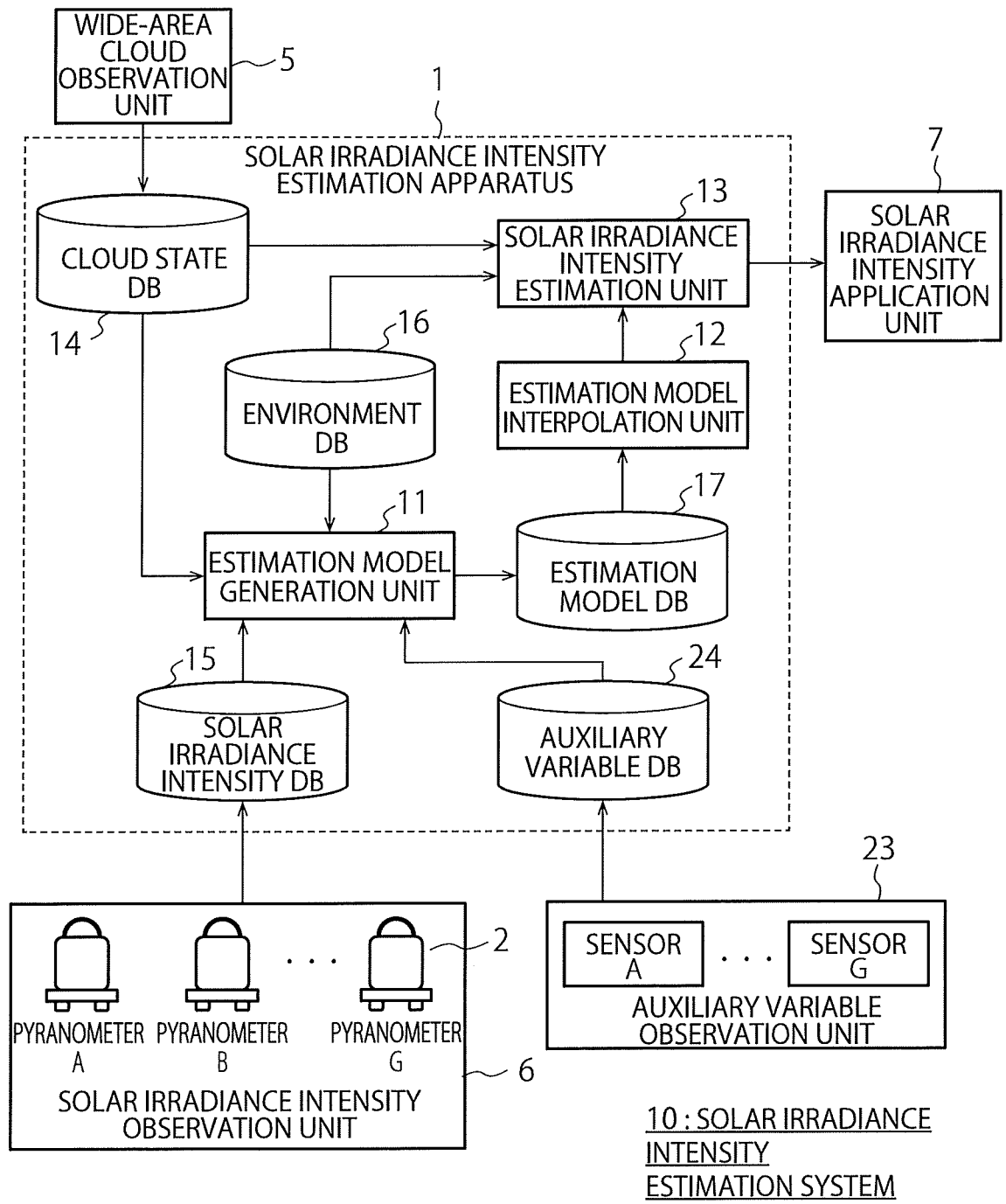
FIG. 14 is a block diagram illustrating a schematic configuration of a solar irradiance intensity estimation system according to a second embodiment.

FIG. 14 is a block diagram illustrating a schematic configuration of a solar irradiance intensity estimation system 10 including a solar irradiance intensity estimation apparatus 1 according to the second embodiment. The solar irradiance intensity estimation apparatus 1 in FIG. 14 includes an auxiliary variable observation unit 23 and an auxiliary variable DB 24 in addition to the internal configuration of the solar irradiance intensity estimation apparatus 1 in FIG. 2.

The auxiliary variable observation unit 23 has a plurality of sensors that observes the auxiliary variable at a plurality of observation points based on the cloud state data. As described above, the auxiliary variable is, for example, a variable to identify the cloud shapes at the target point X and each observation point, and the auxiliary variable has a unique value for each point. Incidentally, the auxiliary variable is information that is not included in the cloud state data although the specific content of the auxiliary variable is not limited.

Figures 15, 16:
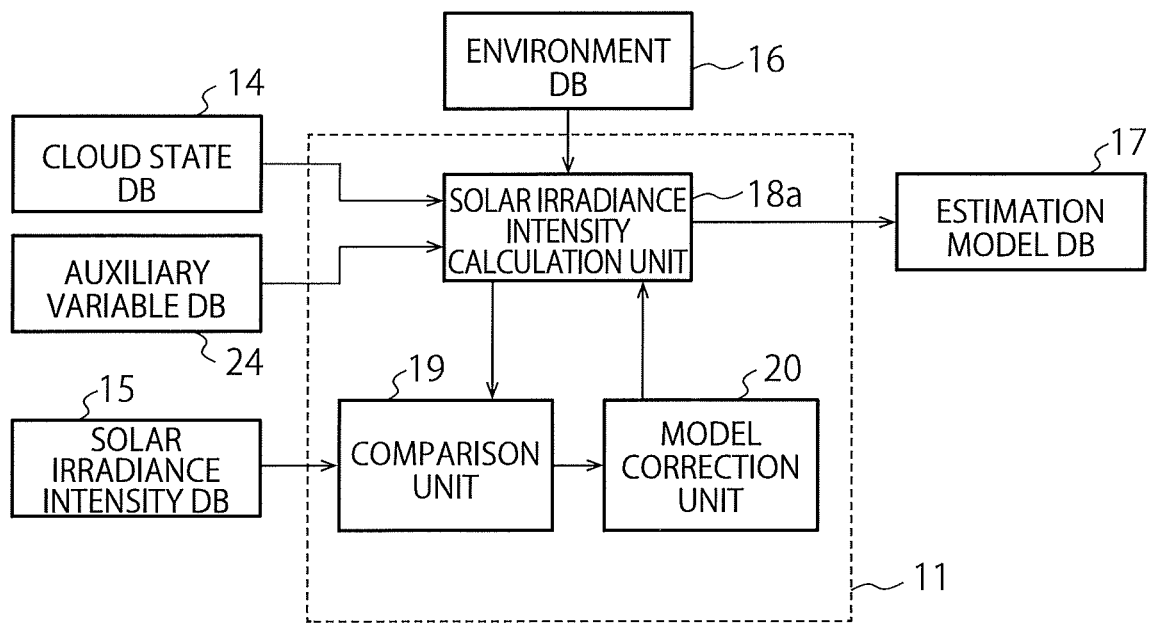
FIG. 15 is a view illustrating a data configuration of an auxiliary variable DB.
FIG. 16 is a block diagram illustrating an internal configuration of an estimation model generation unit according to the second embodiment.

The auxiliary variable DB 24 stores a value of the auxiliary variable observed by the auxiliary variable observation unit 23. FIG. 15 is a view illustrating a data configuration of the auxiliary variable DB 24. The auxiliary variable DB 24 in FIG. 15 has a parameter value table 24a and an observation point position table 24b. The parameter value table 24a stores values of auxiliary variables at the respective observation points at each time. The observation point position table 24b stores a longitude (deg) and a latitude (deg) of each observation point.

FIG. 16 is a block diagram illustrating an internal configuration of an estimation model generation unit 11 according to the second embodiment. The estimation model generation unit 11 in FIG. 16 is different from the solar irradiance intensity calculation unit 18 in FIG. 7 in terms of a processing operation of a solar irradiance intensity calculation unit 18a. The solar irradiance intensity calculation unit 18a in FIG. 16 calculates a solar irradiance intensity at each observation point considering not only the cloud state data but also the auxiliary variable. The model correction unit 20 corrects an estimation model at each observation point based on the calculated solar irradiance intensity and an actually-measured solar irradiance intensity. As a result, model parameters a and b are corrected based on the auxiliary variable.

When the auxiliary variable is $z_t$, the estimation model is expressed by the following Formula (5).

$$I_A(r_t) = ar_t + b + cz_t \quad (5)$$

Figure 17:
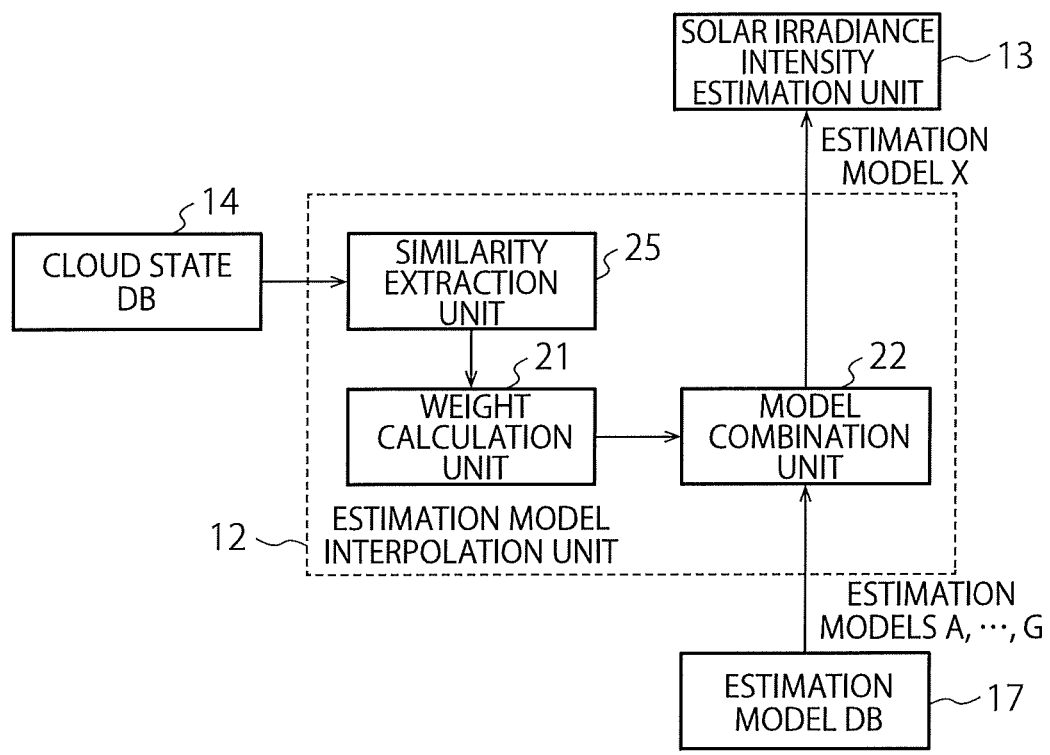
FIG. 17 is a block diagram illustrating an example of an internal configuration of an estimation model interpolation unit.

FIG. 17 is a block diagram illustrating an example of an internal configuration of an estimation model interpolation unit 12. The estimation model interpolation unit 12 in FIG. 17 is obtained by adding a similarity extraction unit 25 to the estimation model interpolation unit 12 in FIG. 9. The similarity extraction unit 25 extracts a similarity of a cloud state between the target point X and each of the plurality of observation points based on the auxiliary variable.

A similarity calculation method is called a propagation model. First, it is assumed that the cloud states of the respective points are arrayed in a lattice pattern in the cloud state data over the wide area in order to facilitate understanding of the problem. For example, the satellite image is given exactly in this form. The cloud state data obtained by a radar is not necessarily provided in a lattice shape, but is easily converted into the lattice shape. Hereinafter, each lattice point is called a pixel with the case of the satellite image in mind.

Figure 18:
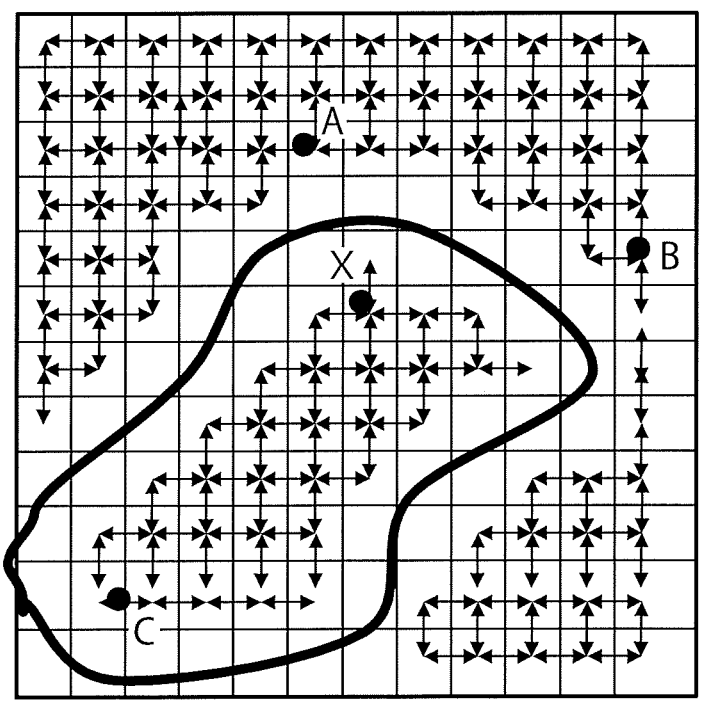
FIG. 18 is a view in which pixels having high similarities are connected by arrows.

In the propagation model, attention is paid to a similarity between adjacent pixels. In the situation of FIG. 13, a similarity between pixels immediately under the same cloud lump and a similarity between pixels outside the cloud lump are high. On the other hand, a similarity between a pixel outside the cloud lump and a pixel immediately under the cloud lump is low. FIG. 18 is a view in which pixels having high similarities are connected by arrows. The target point X is connected with the observation point C by the arrow, but is separated from the observation points A and B. In the propagation model, it is considered that the similarity propagates along the arrow.

The propagation model can be implemented as a numerical algorithm as follows. It is assumed that the total number of pixels is n, and each pixel is appropriately indexed. A similarity $w_{ij}$ between adjacent pixels is defined using cloud state values $r_i$ and $r_j$ for adjacent pixels i and j as expressed in the following Formula (6).

$$w_{ij} = \exp\left\{-\frac{|r_i - r_j|^2}{\sigma^2}\right\} \qquad (6)$$

Here, σ is set to a standard deviation of a value of the cloud state data inside the image, but may be appropriately adjusted. Next, $w_{ij}$ is used to calculate a propagation coefficient $p_{ij}$ from the pixel i to the adjacent pixel j as expressed in the following Formula (7).

$$p_{ij} = \frac{w_{ij}}{\sum_k w_{ik}} \qquad (7)$$

Here, a range of a value of k is all pixels adjacent to the pixel i. Further, the similarity extraction unit 25 forms a propagation matrix $P=(p_{ij})$ having n rows and n columns.

At this time, indices of pixels at which the observation points exist are expressed by $L=(i_A, i_B, \ldots, \text{and } i_G)$ and the other index is expressed by U, the propagation matrix P is expressed by the following Formula (8) by appropriately rearranging the order.

$$P = \begin{vmatrix} P_{LL} & P_{LU} \\ P_{UL} & P_{UU} \end{vmatrix} \qquad (8)$$

At this time, a similarity matrix $S_{UL}$ based on the propagation in which the pixels at which the observation points exist and the other pixels have the similarities is expressed by the following Formula (9).

$$S_{UL}=(S_{ij})=(1-P_{UU})P_{UL} \qquad (9)$$

Assuming that an index corresponding to the target point X in the matrix of Formula (9) is $I_X$, the row $i_X$ of the matrix $S_{UL}$ expressed in the following Formula (10) represents weights of the observation points A, B, . . . , and G with respect to the target point X.

$$(S_{i_X i_A}, S_{i_X i_B}, \ldots, S_{i_X i_G}) \qquad (10)$$

As the weight of Formula (10) is substituted to the above-described Formula (4), it is possible to generate the estimation model of the target point X by combining the estimation models of the plurality of observation points.

In this manner, the weights of the plurality of observation points are calculated taking the similarity in the cloud state between the target point X and the plurality of observation points into consideration, and the estimation model of the target point X is generated by combining the estimation models of the respective observation points using the calculated weights in the second embodiment. Thus, it is possible to estimate the solar irradiance intensity at the target point X by taking the cloud state into consideration.

Third Embodiment

In the above-described first and second embodiments, the model parameters of the estimation models at the respective observation points are matched based on the actually-measured solar radiation intensities at the plurality of observation points, and then, the respective estimation models are combined to generate the estimation model of the target point X. A method of generating an estimation model by matching statistical data without going deep into a structure inherently provided in a target that needs to be estimated in this manner is called a black box approach, and an estimation model generated based on this approach is called a black box model.

The simple estimation model having the two model parameters a and b has been described in the first embodiment. In practice, the model of estimating the solar irradiance intensity has many weather conditions that needs to be considered, and thus, becomes more complicated. For example, when the ground solar irradiance intensity is estimated based on the reflection intensity of sunlight observed by the meteorological satellite 3, first, the estimation is greatly affected by the geometrical arrangement of three parties including the sun, the satellite, and the target point X on the ground surface, such as an altitude, a latitude, and a longitude. In addition to this, it is also necessary to consider the amount of water vapor in the atmosphere, the quantities of fine particles in the atmosphere, a ground surface reflection coefficient, and the like. If these factors are incorporated into the regression model for solar irradiance intensity estimation as explanatory variables, more parameters are required so that the processing of the estimation model generation unit 11 becomes complicated.

A calculation method of estimating the ground solar irradiance intensity based on the reflection intensity observed in the satellite image is well known. In consideration of each component in the atmosphere, the reflection, scattering, and absorption on the ground surface, it is possible to calculate how much the incident sunlight goes out in which direction. This is called radiative transfer calculation. Although it is necessary to designate an atmospheric state in detail in order for accurate calculation, it is known that the atmospheric state can be approximately integrated into a quantity called an optical depth. An optical depth d of the atmosphere is the quantity relating to a transmittance T which indicates how much the sunlight coming from outside the atmosphere reaches the ground surface, and the transmittance T and the optical depth d are expressed by the following Formula (11).

$$T=\exp(-d) \qquad (11)$$

The radiation transfer calculation is used to obtain a relationship between the optical depth d and a reflection intensity r observed by the satellite as a function $r=F_1(d)$ under given atmospheric conditions. The optical depth d can be calculated inversely based on the reflection intensity r using this relationship. The radiation transfer calculations can also obtain a relationship between the optical depth d and a solar irradiance intensity $I=F_2(d)$ on the ground under given atmospheric conditions.

In this manner, the optical depth d is obtained based on the reflection intensity r, and the ground solar irradiance intensity I can be estimated based on the optical depth d.

Figure 19:
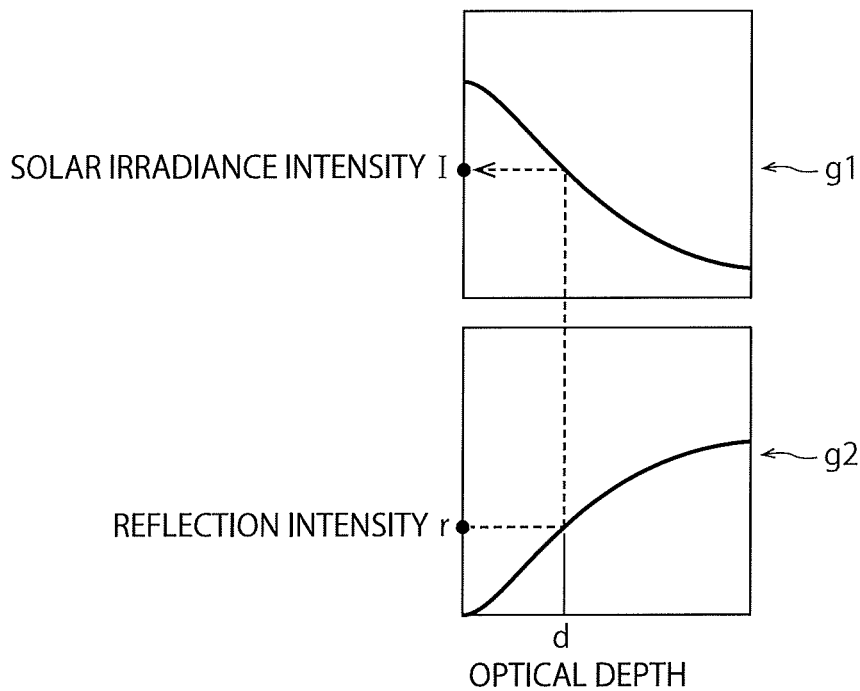
FIG. 19 is a graph indicating a relationship between an optical depth and a reflection intensity and a graph indicating a relationship between the optical depth and the solar irradiance intensity.

FIG. 19 illustrates a graph g1 indicating the relationship between the optical depth d and the reflection intensity, and a graph g2 indicating the relationship between the optical depth d and the solar irradiance intensity. If calculation formulas for the two graphs g1 and g2 illustrated in FIG. 19 are known and the reflection intensity at the observation point can be acquired from the satellite image, it is possible to easily estimate the solar irradiance intensity I at the observation point by using these formulas.

As illustrated in FIG. 19, an approach of calculating and estimating the solar irradiance intensity after clarifying a mechanism and a procedure that bring about a state that needs to be estimated, is called a white box approach, and a model created in this manner is called a white box model.

However, the estimation accuracy of the solar irradiance intensity calculated in this manner is not necessarily high. It is because the approximation is also included in the radiative transfer calculation, and the accuracy of designation of the atmospheric condition has a limit and includes an error. In order to increase the estimation accuracy of the solar irradiance intensity, it is necessary to introduce a mechanism to adjust the estimation model by matching with the observation data.

A gray box approach is obtained by adopting advantages of the above-described two white box and black box approaches and compensating for problems thereof. A solar irradiance intensity estimation apparatus 1 according to the third embodiment has the gray box model as an estimation model.

The solar irradiance intensity estimation apparatus 1 according to the third embodiment has the same block configuration as in FIG. 2, but is different from that of the first embodiment in terms of the processing operation of the solar irradiance intensity calculation unit 18 in the estimation model generation unit 11 of FIG. 7.

Figure 20:
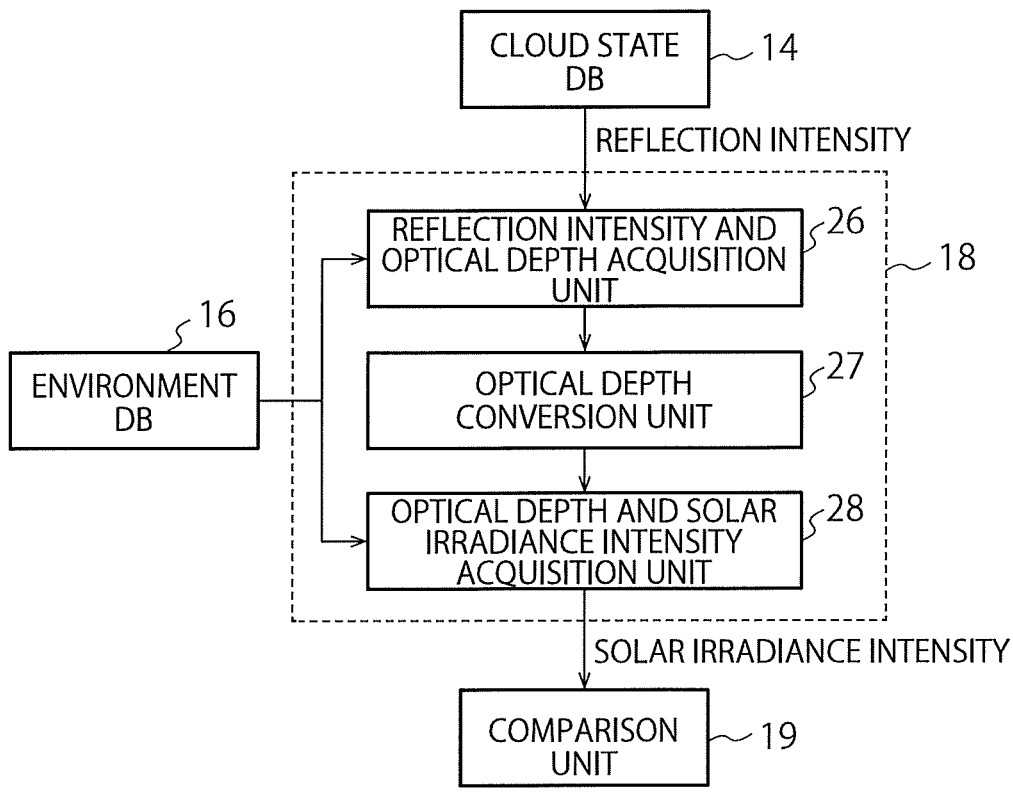
FIG. 20 is a block diagram illustrating an example of an internal configuration of a solar irradiance intensity calculation unit.

FIG. 20 is a block diagram illustrating an example of an internal configuration of a solar irradiance intensity calculation unit 18. The solar irradiance intensity calculation unit 18 in FIG. 20 has a reflection intensity and optical depth acquisition unit 26, an optical depth conversion unit 27, and an optical depth and solar irradiance intensity acquisition unit 28.

The reflection intensity and optical depth acquisition unit 26 acquires a correspondence relationship between a reflection intensity of sunlight at each point obtained from a satellite image and an optical depth indicating a rate of the sunlight reaching the ground. More specifically, the reflection intensity and optical depth acquisition unit 26 performs the radiative transfer calculation to calculate the optical depth of the atmosphere based on the reflection intensity observed by a satellite under given weather conditions. Since this calculation requires time, the correspondence relationship between the reflection intensity and the optical depth may be calculated in advance and stored in a dedicated table such that a corresponding optical depth is read when a reflection intensity is input to this table. When such a table is prepared, the reflection intensity values stored in the table are discrete. Accordingly, when it is desired to obtain an optical depth corresponding to a reflection intensity that is not stored in the table, interpolation processing may be performed based on a plurality of reflection intensities in the table, which are close to the reflection intensity that is not stored in the table, and optical depths corresponding thereto, thereby obtaining the optical depth corresponding to the desired reflection intensity.

The optical depth and solar irradiance intensity acquisition unit 28 acquires a correspondence relationship between an optical depth and a solar irradiance intensity.

More specifically, the optical depth and solar irradiance intensity acquisition unit 28 uses the radiative transfer calculation to calculate the solar irradiance intensity on the ground surface based on the optical depth of the atmosphere under given weather conditions. Since this calculation requires time, the correspondence relationship between the optical depth and the solar irradiance intensity may be calculated in advance and stored in a dedicated table such that a corresponding solar irradiance intensity is read when an optical depth is input to this table. When such a table is prepared, the optical depth values stored in the table are discrete. Accordingly, when it is desired to obtain a solar irradiance intensity corresponding to an optical depth that is not stored in the table, interpolation processing may be performed based on a plurality of optical depths in the table, which are close to the optical depth that is not stored in the table, and solar radiation intensities corresponding thereto, thereby obtaining the solar irradiance intensity corresponding to the desired optical depth.

The optical depth obtained by the reflection intensity and optical depth acquisition unit 26 and the optical depth input to the optical depth and solar irradiance intensity acquisition unit 28 inherently need to coincide with each other, but in practice, a deviation occurs therebetween. Thus, the optical depth conversion unit 27 converts the optical depth obtained by the reflection intensity and optical depth acquisition unit 26 into an optical depth suitable for the optical depth and solar irradiance intensity acquisition unit 28, and inputs a corrected optical depth after conversion is input to the optical depth and solar irradiance intensity acquisition unit 28 to acquire the solar irradiance intensity. In this manner, more correctly speaking, the optical depth and solar irradiance intensity acquisition unit acquires a correspondence relationship between the corrected optical depth and the solar irradiance intensity.

Figure 21:
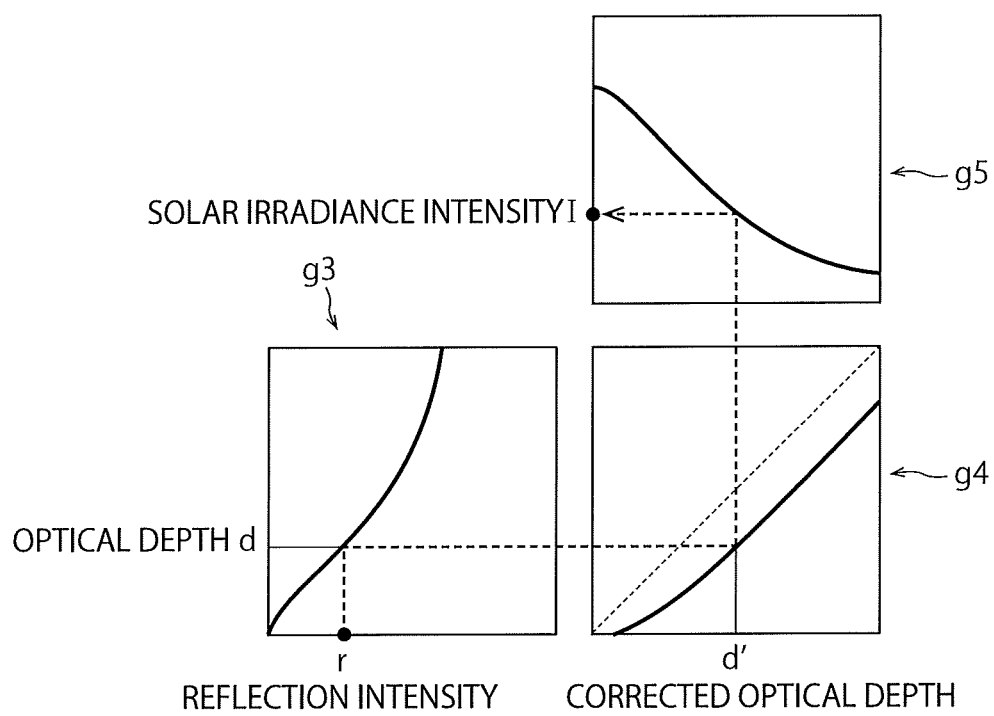
FIG. 21 is a graph indicating a correspondence relationship between the reflection intensity and an optical depth d in a reflection intensity and optical depth acquisition unit, a graph indicating a correspondence relationship between a corrected optical depth d' and the solar irradiance intensity in the optical depth and solar irradiance intensity acquisition unit, and a graph indicating a correspondence relationship between the optical depth d and the corrected optical depth d' in an optical depth conversion unit.

FIG. 21 illustrates a graph g3 indicating the correspondence relationship between the reflection intensity and the optical depth d in the reflection intensity and optical depth acquisition unit 26, a graph g4 indicating a correspondence relationship between the optical depth d and a corrected optical depth d' in the optical depth conversion unit 27, and a graph g5 indicating a correspondence relationship between the corrected optical depth d' and the solar irradiance intensity in the corrected optical depth and solar irradiance intensity acquisition unit 28.

The optical depth conversion unit 27 converts the optical depth d obtained by the reflection intensity and optical depth acquisition unit 26 into the optical depth d' based on the following Formula (12) and inputs the optical depth d' to the optical depth and solar irradiance intensity acquisition unit 28.

$$d'=f(d;\alpha,\beta,\gamma)=\beta(d+\gamma)^\alpha \tag{12}$$

Incidentally, Formula (12) illustrates the example of converting the optical depth using the function f having three parameters, but this is merely an example, and the number of parameters of the function f may be arbitrarily changed.

When the conversion of the optical depth is performed based on Formula (12), the solar irradiance intensity I of the observation point estimated by the optical depth and solar irradiance intensity acquisition unit 28 is expressed by the following Formula (13).

$$I(r)=F_2(f(F_1(r);\alpha,\beta,\gamma)) \qquad (13)$$

The estimation model generation unit 11 optimizes the above-described parameters $\alpha$, $\beta$, and $\gamma$ such that the estimated solar irradiance intensity matches the actually-measured solar irradiance intensity. When the least-square method is used for optimization, the parameters $\alpha$, $\beta$, and $\gamma$ are expressed by the following Formula (14).

[Expression 8]

$$\alpha, \beta, \gamma = \arg\min_{\alpha,\beta,\gamma} \sum_t (I_t - I(r_t))^2 \qquad (14)$$

In this manner, the optical depth is obtained from the correspondence relationship between the reflection intensity and the optical depth after acquiring the reflection intensity of the observation point, for example, from the satellite image, and then, the optical depth is converted by the optical depth conversion unit 27, and the solar irradiance intensity at the observation point is estimated from the correspondence relationship between the converted optical depth and the solar irradiance intensity in the third embodiment.

As a result, it is possible to easily and accurately estimate the solar irradiance intensity without taking detailed weather conditions and the like into consideration.

At least a part of the solar irradiance intensity estimation apparatus 1 and the solar irradiance intensity estimation system 10 described in the above embodiments may be configured by hardware or software. When configured by the software, a program to implement at least some functions of the solar irradiance intensity estimation apparatus 1 and the solar irradiance intensity estimation system 10 may be stored in a recording medium, such as a flexible disk and a CD-ROM, and then may be read and executed by a computer. The recording medium is not limited to a detachable storage medium, such as a magnetic disk and an optical disc, and may be a fixed recording medium, such as a hard disk and a memory.

In addition, a program to implement at least some of functions of the solar irradiance intensity estimation apparatus 1 and the solar irradiance intensity estimation system 10 may be distributed through a communication line, such as the Internet, (including radio communication). Further, the program that has been encrypted, modulated, or compressed, may be distributed through a wired line or a wireless line, such as the Internet, or may be stored in a recording medium and then may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A solar irradiance intensity estimation apparatus, comprising:
    processing circuitry configured to
        generate estimation models of solar irradiance intensities at a plurality of observation points based on cloud state data, and based on solar irradiance intensities measured at the plurality of observation points;
        generate an estimation model of a solar irradiance intensity at a target point, different from the plurality of observation points, based on the estimation models of solar irradiance intensities at the plurality of observation points, wherein a solar irradiance intensity was not measured at the target point;
        estimate a solar irradiance intensity at the target point based on a reflection intensity at the target point obtained from the cloud state data and the generated estimation model of a solar irradiance intensity at the target point;
        store the cloud state data, which is measured by a cloud observation sensor;
        store environment information including at least one of an amount of water vapor in the atmosphere, quantities of particles in the atmosphere, a ground surface reflection coefficient, and a sunlight intensity outside the atmosphere,
        acquire a correspondence relationship between a reflection intensity of sunlight at each point obtained from a satellite image and an optical depth indicating a rate of sunlight reaching a ground;
        acquire a corrected optical depth obtained by correcting the optical depth;
        acquire a correspondence relationship between the corrected optical depth and solar irradiance intensity;
        acquire the optical depth corresponding to a reflection intensity of sunlight at each observation point, obtained from the satellite image, then, acquire the corrected optical depth, obtained by correcting the acquired optical depth, and then, acquire, at each observation point, the solar irradiance intensity corresponding to the acquired corrected optical depth; and
        store the acquired solar irradiance intensity at each of the plurality of observation points,
    wherein the processing circuitry is further configured to generate the estimation models of the solar irradiance intensities at the plurality of observation points based on the stored cloud state data, the stored solar irradiance intensities, and the stored environmental information.

2. The solar irradiance intensity estimation apparatus according to claim 1, wherein the processing circuitry is further configured to:
    calculate the solar irradiance intensity at each observation point based on the cloud state data, the environment information, and a preset estimation model; and
    correct the preset estimation model such that the calculated solar irradiance intensity matches the solar irradiance intensity measured at each observation point.

3. The solar irradiance intensity estimation apparatus according to claim 1, wherein
    the environmental information stored by the processing circuitry includes at least one of information on an atmospheric state at the observation point and position information of the observation point.

4. The solar irradiance intensity estimation apparatus according to claim 1, wherein the cloud state data includes reflection intensities of sunlight reflected by a cloud, at the plurality of observation points and the target point obtained from a satellite image, and the processing circuitry is further configured to generate the estimation models of solar irradiance intensities at the plurality of observation points based on the reflection intensities at the plurality of observation points and the solar radiation intensities measured at the plurality of observation points.

5. The solar irradiance intensity estimation apparatus according to claim 1, wherein the processing circuitry is further configured to generate the estimation models of solar irradiance intensities at the plurality of observation points based on the cloud state data measured by a cloud observation sensor and the solar irradiance intensities at the plurality of observation points measured by a solar irradiance intensity observation sensor, and supply the estimated solar irradiance intensity at the target point to a solar irradiance intensity application apparatus.

6. The solar irradiance intensity estimation apparatus according to claim 1, wherein the processing circuitry is further configured to extract a characteristic indicating a weather condition at the target point and t each of the plurality of observation points, and generate the estimation model of the solar irradiance intensity at the target point based on the estimation models of solar irradiance intensities at the plurality of observation points and the extracted characteristic.

7. The solar irradiance intensity estimation apparatus according to claim 6, wherein the processing circuitry is further configured to extract a cloud shape as the characteristic at each of the plurality of observation points and g the target point.

8. A solar irradiance intensity estimation system, comprising:

a cloud observation sensor that measures cloud state data;

a solar irradiance intensity observation sensor that measures solar radiation intensities at a plurality of observation points in a target region; and processing circuitry configured to generate estimation models of solar irradiance intensities at the plurality of observation points based on the measured cloud state data and the solar irradiance intensities measured at the plurality of observation points;

generate an estimation model of a solar irradiance intensity at a target point, different from the plurality of observation points, based on the estimation models of solar irradiance intensities at the plurality of observation points, wherein a solar irradiance intensity was not measured at the target point;

estimate the solar irradiance intensity at the target point based on a reflection intensity at the target point obtained from the cloud state data and the generated estimation model of a solar irradiance intensity at the target point;

store the cloud state data measured by the cloud observation sensor;

store environment information including at least one of an amount of water vapor in the atmosphere, quantities of particles in the atmosphere, a ground surface reflection coefficient, and a sunlight intensity outside the atmosphere;

acquire a correspondence relationship between a reflection intensity of sunlight at each point obtained from a satellite image and an optical depth indicating a rate of sunlight reaching a ground;

acquire a corrected optical depth obtained by correcting the optical depth;

acquire a correspondence relationship between the corrected optical depth and a solar irradiance intensity; and acquire the optical depth corresponding to a reflection intensity of sunlight at each observation point, obtained from the satellite image, then, acquire the corrected optical depth, obtained by correcting the acquired optical depth, and then, acquire, at each observation point, the solar irradiance intensity corresponding to the acquired corrected optical depth; and store the acquired solar irradiance intensity at each of the plurality of observation points, wherein the processing circuitry is further configured to generate the estimation models of the solar irradiance intensities at the plurality of observation points based on the stored cloud state data, the stored solar irradiance intensities, and the stored environmental information.

9. A solar irradiance intensity estimation method comprising:

generating estimation models of solar irradiance intensities at a plurality of observation points based on cloud state data, and based on solar irradiance intensities measured at the plurality of observation points;

generating an estimation model of a solar irradiance intensity at a target point, different from the plurality of observation points, based on the estimation models of solar irradiance intensities at the plurality of observation points, wherein a solar irradiance intensity was not measured at the target point; and estimating a solar irradiance intensity at the target point based on a reflection intensity at the target point obtained from the cloud state data and the generated estimation model at the target point;

storing the cloud state data, which is measured by a cloud observation sensor;

storing environment information including at least one of an amount of water vapor in the atmosphere, quantities of particles in the atmosphere, a ground surface reflection coefficient, and a sunlight intensity outside the atmosphere, acquiring a correspondence relationship between a reflection intensity of sunlight at each point obtained from a satellite image and an optical depth indicating a rate of sunlight reaching a ground;

acquiring a corrected optical depth obtained by correcting the optical depth;

acquiring a correspondence relationship between the corrected optical depth and a solar irradiance intensity; and acquiring the optical depth corresponding to a reflection intensity of sunlight at each observation point, obtained from the satellite image, then, acquiring the corrected optical depth, obtained by correcting the acquired optical depth, and then, acquiring, at each observation point, the solar irradiance intensity corresponding to the acquired corrected optical depth; and storing the acquired solar irradiance intensity at each of the plurality of observation points, wherein the step of generating the estimation models comprises generating the estimation models of the solar irradiance intensities at the plurality of observation points based on the stored cloud state data, the stored solar irradiance intensities, and the stored environmental information.

10. The solar irradiance intensity estimation method according to claim 9, wherein the generating of the estimation model comprises:
calculating the solar irradiance intensity at each observation point based on the cloud state data, the environment information, and a preset estimation model; and
correcting the preset estimation model such that the calculated solar irradiance intensity matches the solar irradiance intensity observed at each observation point.

11. The solar irradiance intensity estimation method according to claim 9, wherein the environmental information includes at least one of information on an atmospheric state at each observation point and position information of each observation point.

12. The solar irradiance intensity estimation method according to claim 9, wherein
the cloud state data includes reflection intensities of sunlight reflected by a cloud, at the plurality of observation points and the target point obtained from a satellite image, and
the generating of the estimation model includes generating the estimation models of solar irradiance intensities at the plurality of observation points based on the reflection intensities at the plurality of observation points and the solar irradiance intensities measured at the plurality of observation points.

13. The solar irradiance intensity estimation method according to claim 9, wherein
the generating of the estimation model includes generating the estimation models of solar irradiance intensities at the plurality of observation points based on the cloud state data and the solar irradiance intensities at the observed plurality of observation points, and
the estimating of the solar irradiance intensity includes supplying the estimated solar irradiance intensity at the target point to a solar irradiance intensity application unit.

14. The solar irradiance intensity estimation method according to claim 9, further comprising
extracting a characteristic indicating a weather condition at the target point and a each of the plurality of observation points,
wherein the estimation model of a solar irradiance intensity at the target point is generated based on the estimation models of solar irradiance intensities at the plurality of observation points and the extracted characteristic.

15. The solar irradiance intensity estimation method according to claim 14, wherein
the extracting of the characteristic includes extracting a cloud shape at each of the plurality of observation points and at the target point.

* * * * *